United States Patent
Jarvinen et al.

(10) Patent No.: US 11,321,048 B2
(45) Date of Patent: May 3, 2022

(54) METHOD AND APPARATUS FOR TEMPORARY HANDS-FREE VOICE INTERACTION

(71) Applicant: Motorola Solutions, Inc., Chicago, IL (US)

(72) Inventors: Jari P. Jarvinen, Coral Springs, FL (US); Sean P Regan, Boca Raton, FL (US); Craig F Siddoway, Davie, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 51 days.

(21) Appl. No.: 16/800,917

(22) Filed: Feb. 25, 2020

(65) Prior Publication Data

US 2021/0263703 A1 Aug. 26, 2021

(51) Int. Cl.
*G10L 15/22* (2006.01)
*G06F 3/16* (2006.01)
*G10L 15/28* (2013.01)
*G10L 17/24* (2013.01)

(52) U.S. Cl.
CPC ............ *G06F 3/167* (2013.01); *G10L 15/285* (2013.01); *G10L 17/24* (2013.01); *G10L 15/22* (2013.01); *G10L 2015/223* (2013.01)

(58) Field of Classification Search
CPC ......... G10L 15/22; G10L 15/26; G10L 17/24; H04M 1/6083
See application file for complete search history.

(56) References Cited

U.S. PATENT DOCUMENTS

| 9,368,105 B1 | 6/2016 | Freed et al. |
| 2006/0085199 A1* | 4/2006 | Jain .......................... G10L 15/26 704/E15.045 |
| 2014/0222436 A1* | 8/2014 | Binder .................... G10L 15/26 704/275 |

(Continued)

FOREIGN PATENT DOCUMENTS

| CA | 2837291 A1 * | 7/2014 | ............. G10L 15/22 |
| EP | 3192072 | 7/2017 | |

(Continued)

OTHER PUBLICATIONS

International Search Report and Written Opinion of International Application No. PCT/US2021/018637, dated Jun. 7, 2021, 12 pages.

*Primary Examiner* — Feng-Tzer Tzeng
(74) *Attorney, Agent, or Firm* — Baker Botts L.L.P.

(57) ABSTRACT

A battery-operated communication device for temporary hands-free voice interaction may include a microphone that is configured to receive sound and a processor that is communicatively coupled to the microphone and is configured to receive a first trigger to enable hands-free operation, initiate hands-free operation, receive audio input using the microphone, compare a portion of the audio input to one or more predetermined audio commands, determine whether the portion corresponds to a matching command of the predetermined audio commands, and process the matching command based on a determination that the portion corresponds to the matching command. The first trigger may correspond to a remote user request, an event location, a location condition, or any combination of a remote user request, event location, and location condition.

18 Claims, 8 Drawing Sheets

(56) References Cited

U.S. PATENT DOCUMENTS

2014/0244253 A1    8/2014   Bringert et al.
2016/0077794 A1    3/2016   Kim et al.

FOREIGN PATENT DOCUMENTS

| EP | 3447764 A1 | 2/2019 | |
|----|------------|--------|---|
| WO | 2014/197737 A1 | 12/2014 | |
| WO | WO-2014197737 A1 * | 12/2014 | ............. G06F 3/167 |
| WO | 2016/039992 A1 | 3/2016 | |

* cited by examiner

METHOD AND APPARATUS FOR TEMPORARY HANDS-FREE VOICE INTERACTION

BACKGROUND OF THE INVENTION

Feature rich electronic devices, including portable electronic communication devices, have evolved from simple analog devices to multifunction computing systems supporting multiple communication protocols. Devices may rely on a speaker for audio output, a microphone for audio input, and a button to initiate control commands. The speaker, microphone, and button may be integrated in the device and one or more remote devices, such as a remote speaker microphone.

In public-safety or mission-critical environments, a user may use voice interaction with electronic communication devices. However, users in such environments cannot rely on manual activation of a button when a user's hands are fully occupied with public-safety or mission-critical tasks. In addition, allowing inadvertent voice interactions risks malicious use by mischievous outsiders present in such public-safety or mission-critical environments. These limitations typically may not be overcome by physically pressing a button or allowing voice interactions with a universal wake word for multiple users or devices because users may need to use their hands for public-safety or mission-critical tasks while avoiding the risk of malicious or inadvertent voice interactions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
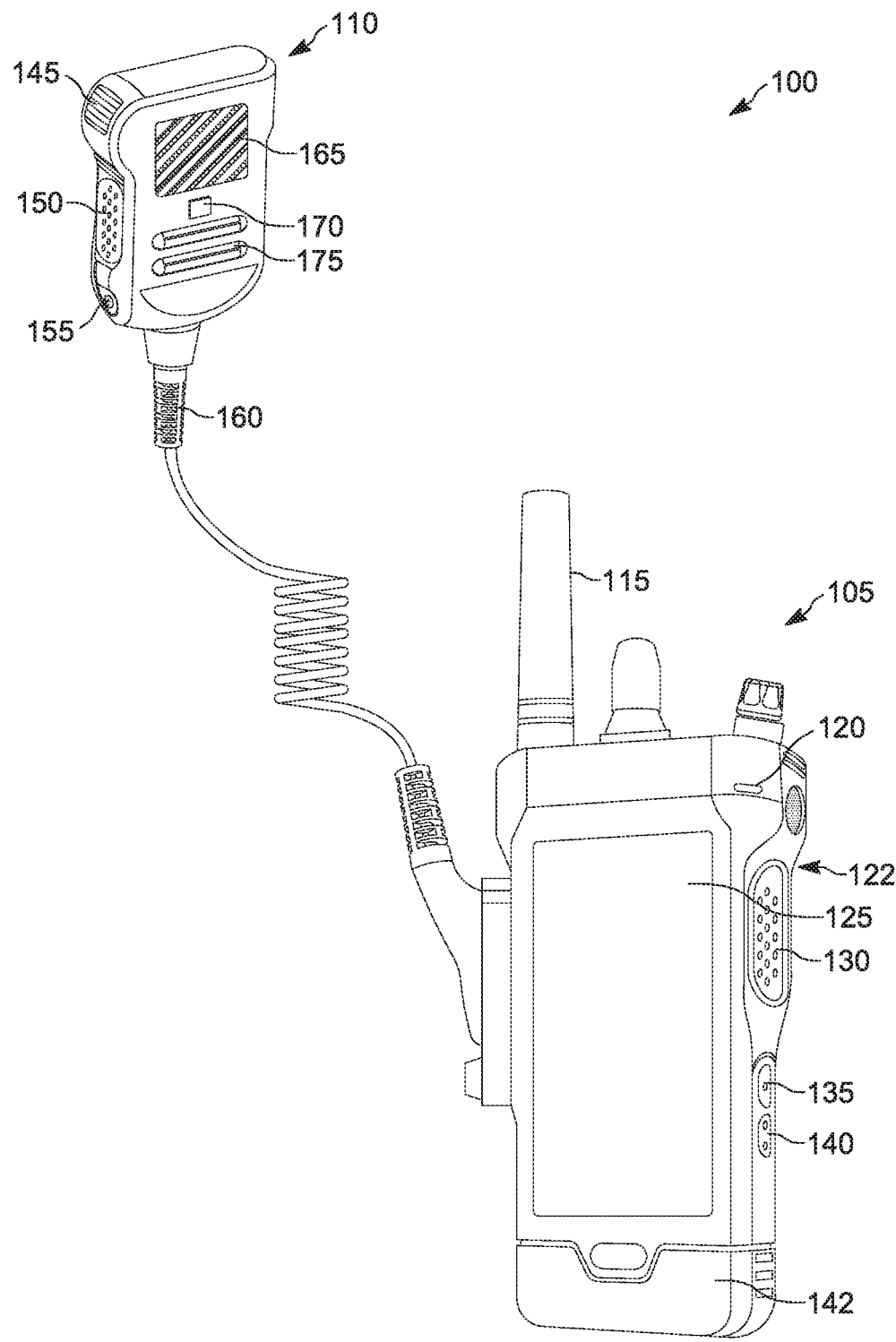
FIG. 1 is a perspective view of an example battery-operated communication device for temporary hands-free voice interaction, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and apparatus for temporary hands-free voice interaction in public-safety or mission-critical environments. In one embodiment, a disclosed battery-operated communication device includes a microphone and a processor. The microphone may be configured to receive sound and the processor may be communicatively coupled to the microphone. As described herein, the processor may be configured to receive a first trigger to enable hands-free operation, initiate hands-free operation after receipt of the first trigger, receive audio input using the microphone after initiation of the hands-free operation, compare a first portion of the audio input to predetermined audio command(s), determine whether the first portion of the audio input compared to predetermined audio command(s) corresponds to a matching command of the predetermined audio command(s), and process the matching command based on a determination that the first portion of the audio input corresponds to the matching command. The first trigger may correspond to a first remote user request, a first event condition, a first location condition, or any combination of a first remote user request, first event condition, and first location condition.

In various embodiments, the processor may be configured to exit from hands-free operation may be based on a determination that an inactivity period for receiving audio input has expired or receipt of a second trigger to disable the hands-free operation. The second trigger may correspond to a second remote user request, a second event condition, a second location condition, or any combination of a second remote user request, second event condition, and second location condition.

In various embodiments, the processor may be configured to assign a temporary wake word to a user, compare a second portion of the audio input to the temporary wake word, and determine whether the second portion of the audio input corresponds to the temporary wake word based on the comparison between the second portion of the audio input to the temporary wake word. As described herein, the comparison of the first portion of the audio input to the predetermined audio command(s) may be based on a determination that the second portion of the audio input corresponds to the temporary wake word. The temporary wake word assigned to the user may be unique to the user and the second portion may precede the first portion in the audio input.

In various embodiments, the processor may be configured to output a temporary wake word notification of the assigned temporary wake word, receive, in response to the temporary wake word notification, an approval of the assigned temporary wake word or a rejection of the temporary wake word, and assign another temporary wake word to the user in response to the receipt of the rejection of the assigned temporary wake word.

In various embodiments, the processor may be configured to output a notification for hands-free operation after the first trigger is received to enable the hands-free operation. In response to the output of the notification for hands-free operation, the processor may be configured to receive a review indication of the hands-free operation, which may correspond to an approval or rejection to initiate hands-free operation, in which hands-free operation may be initiated when the review indication corresponds to an approval. As described herein, receipt of the audio input using the microphone may be implemented by the hands-free operation listening for the audio input, which may be provided independent of any physical input from a user, such as the pressing of a button or activation of a switch.

In various embodiments, the first remote user request may represent the hands-free operation being enabled by a dispatcher for a user, all users assigned to an incident, all users assigned to a role for the incident, or any combination thereof. In various embodiments, the first event condition may represent the hands-free operation being enabled by a change in a state of a vehicle, a status of a user, a state of a user, or any combination thereof. In various embodiments, the first location condition represents an arrival of a user on a location of an incident, which may be indicated by a location of the user matching the location of the incident, the arrival of the user on the location of the incident before a second user, in which the second user may be using another device, or a dispatcher.

In various embodiments, the battery-operated communication device may include a display and a speaker, which may each be communicatively coupled to the processor. The display may be configured to output video and the speaker may be configured to output sound. The processor may be configured to output a wake word expiration notification based on a determination that a temporary wake word period has expired, assign a new temporary wake word to the user, and output a new wake word notification for a new temporary wake word. The new wake word notification may be provided by a voice announcement using the speaker, an audio tone using the speaker, a visual indication using the display, or any combination of a voice announcement using the speaker, audio tone using the speaker, and visual indication using the display.

In various embodiments, the processor may be configured to limit the predetermined audio command(s) to a subset of the predetermined audio command(s). The comparison of the first portion of the audio input to the predetermined audio command(s) may not compare the first portion to the predetermined audio command(s) not found in the subset of the predetermined audio command(s).

In one embodiment, a disclosed method for temporary hands-free voice interaction includes receiving a first trigger to enable hands-free operation, initiating hands-free operation after receipt of the first trigger, receiving audio input after initiation of the hands-free operation, comparing a first portion of the audio input to predetermined audio command(s), determining whether the first portion of the audio input compared to predetermined audio command(s) corresponds to a matching command of the predetermined audio command(s), and processing the matching command based on a determination that the first portion of the audio input corresponds to the matching command. The first trigger may correspond to a first remote user request, a first event condition, a first location condition, or any combination of a first remote user request, first event condition, and first location condition.

In various embodiments, the method may include exiting from hands-free operation. The exit may be based on determining that an inactivity period for receiving audio input has expired or receiving a second trigger to disable the hands-free operation. The second trigger may correspond to a second remote user request, a second event condition, a second location condition, or any combination of a second remote user request, second event condition, and second location condition.

In various embodiments, the method may include assigning a temporary wake word to a device, comparing a second portion of the audio input to the temporary wake word, and determining whether the second portion of the audio input corresponds to the temporary wake word based on the comparison between the second portion of the audio input to the temporary wake word. As described herein, the comparison of the first portion of the audio input to the predetermined audio command(s) may be based on a determination that the second portion of the audio input corresponds to the temporary wake word. The temporary wake word assigned to the device may be unique to the device and the second portion may precede the first portion in the audio input.

In various embodiments, the method may include outputting a temporary wake word notification of the assigned temporary wake word, receiving an approval of the assigned temporary wake word or a rejection of the assigned temporary wake word in response to the temporary wake word notification, and assigning another temporary wake word to the device in response to the receipt of the rejection of the assigned temporary wake word.

In various embodiments, the method may include outputting a notification for hands-free operation after the first trigger is received to enable the hands-free operation and receiving a review indication of the hands-free operation in response to the output of the notification for hands-free operation. The review indication may correspond to an approval or rejection to initiate hands-free operation, in which hands-free operation may be initiated when the review indication corresponds to an approval. As described herein, receipt of the audio input using the microphone may be implemented by the hands-free operation listening for the audio input, which may be provided independent of any physical input from a user, such as the pressing of a button or activation of a switch.

In various embodiments, the first remote user request may represent hands-free operation being enabled by a dispatcher for a user, all users assigned to an incident, all users assigned to a role for the incident, or any combination thereof. In various embodiments, the first event condition may represent the hands-free operation being enabled by a change in a state of a vehicle corresponding to a user, a status of a user, a state of a user, or any combination thereof. In various embodiments, the first location condition represents an arrival of a user on a location of an incident, which may be indicated by a location of the user matching the location of the incident, the arrival of the user on the location of the incident before a second user, in which the second user may be using another device, or a dispatcher.

In various embodiments, the method may include outputting a wake word expiration notification based on a determination that a temporary wake word period has expired, assigning a new temporary wake word to the device, and outputting a new wake word notification for a new temporary wake word. The new wake word notification may be provided by a voice announcement, an audio tone, a visual indication, or any combination of a voice announcement, audio tone, and visual indication.

In various embodiments, the method may include limiting the predetermined audio command(s) to a subset of the predetermined audio command(s). The comparison of the first portion of the audio input to the predetermined audio command(s) may not compare the first portion to the predetermined audio command(s) not found in the subset of the predetermined audio command(s).

As previously noted, electronic devices may integrate a speaker, microphone, and button. The button may be increasingly used for initiating control commands such as voice interactions. At the same time, in public-safety or mission-critical environments, a user cannot rely on manual activation of a button when the user's hands are occupied with public-safety or mission-critical tasks.

For example, in a mission-critical environment, an emergency medical technician is often required to keep both hands on a patient as much as possible, which limits communication with on-scene team members or an emergency room and presents a challenge for documenting the actions taken by the emergency medical technician. In some circumstances, blood may cover the gloves of the emergency medical technician, which may further restrict the use of the emergency medical technician's hands. As another example, in a public-safety environment, a police officer is often required to keep both hands on a suspect or the steering wheel of a vehicle, or keep both hands available for other uses when pursuing a suspect in a vehicle or on foot, or securing a suspect.

Electronic devices may also support a universal wake word common to multiple users or devices to activate a hands-free mode. However, inadvertent activations may occur by users in public-safety or mission-critical environments. In such environments, adjacent users or users in communication may inadvertently activate the hands-free mode by accidentally reciting the universal wake word. For example, one user may unintentionally activate hands-free mode on multiple devices. At the same time, mischievous outsiders in such environments may seek to intentionally activate hands-free mode against the control of the user, which may endanger the authorized user of the device.

Electronic devices may also support continuous activation of hands-free mode. At the same time, however, battery-operated electronic devices have limited battery capacity and continuous activation of hands-free mode encourages excessive power drain from the battery of the electronic device. Thus, solutions appropriate for electronic devices connected to an external power source are often not suitable for battery-operated electronic devices with limited battery capacity.

As described herein, a battery-operated communication device for public-safety or mission-critical environments may include a microphone and a processor. The microphone may be communicatively coupled to the processor and configured to receive sound. The processor may be configured to receive a first trigger to enable hands-free operation, in which the first trigger may correspond to a first remote user request, a first event condition, a first location condition, or any combination of a first remote user request, first event condition, and first location condition. Afterward, hands-free operation may be initiated. The processor may be configured to receive audio input using the microphone after initiation of the hands-free operation, compare a first portion of the audio input to predetermined audio command(s), determine whether the first portion of the audio input compared to predetermined audio command(s) corresponds to a matching command of the predetermined audio command(s), and process the matching command based on a determination that the first portion of the audio input corresponds to the matching command.

This approach may enable hands-free operation without the press of a button or activation of a switch, which may enable a user in public-safety or mission-critical environments to use hands-free operation while the hands of the user are occupied with other tasks. For example, hands-free operation may be enabled by a trigger representing a first remote user request, such as a request by a dispatcher to enable hands-free operation for a user, all users assigned to an incident, all users assigned to a role for the incident, or any combination thereof. As another example, hands-free operation may be enabled by a trigger representing a first event condition, such as a change in a state of a vehicle, a status of a user, a state of a user, or any combination thereof. As yet another example, hands-free operation may be enabled by a trigger representing first location condition, which represents an arrival of a user on a location of an incident as indicated by a location of the user matching the location of the incident, the arrival of the user on the location of the incident before a second user, in which the second user may be using another device, or a dispatcher.

In at least some embodiments, the processor may be configured to assign a temporary wake word to a user, compare a second portion of the audio input to the temporary wake word, and determine whether the second portion of the audio input corresponds to the temporary wake word based on the comparison between the second portion of the audio input to the temporary wake word. This approach may enable a user in public-safety or mission-critical environments to use hands-free operation without inadvertent activation or activation by mischievous outsiders.

In at least some embodiments, hands-free operation may exit, for example, based on a determination that an inactivity period for receiving audio input has expired or receipt of a second trigger. The second trigger may correspond to a second remote user request, a second event condition, a second location condition, or any combination of a second remote user request, second event condition, and second location condition. When hands-free operation exits based on a determination that an inactivity period for receiving audio input has expired, the inactivity period may be dynamically set or set to a predetermined value, such as a default period of five minutes.

This approach may enable hands-free operation without excessively draining power from the battery of the battery-operated communication device. When a voice interaction command is not received, for example, hands-free operation may exit to save the battery from excessive power drain. In addition, receipt of the audio input using the microphone may be implemented by the hands-free operation listening for the audio input, which may be provided independent of any physical input from a user, such as the pressing of a button or activation of a switch. The audio input may be handled by a voice co-processor of the device that is configured to listen for audio input without excessively draining power from the battery. The voice co-processor may enable the application processor, or other non-voice processing portions of the application processor, to power down or enter a low power state during hands-free operation.

In at least some embodiments, notifications for hands-free operation may be provided as a voice announcement, an audio tone, a visual indication, or any combination of a voice announcement, audio tone, and visual indication. This approach may enable a user to provide acceptance, such as an approval or rejection, of one or more actions for hands-free operation including, but not limited to, initiation of hands-free operation, exit from hands-free operation, and assignment of a temporary wake word.

In at least some embodiments, the predetermined audio command(s) for hands-free operation may be limited to a subset of the predetermined audio command(s). In a critical environment, hands-free operation typically may not be manually activated by, for example, the press of a button. For example, a critical environment for an emergency medical technician includes situations in which the emergency medical technician keeps both hands on a patient or has biological material (e.g., blood) on the gloves of the emergency medical technician. As another example, a critical environment for a police officer includes situations in which the police officer keeps both hands free (e.g., during a foot chase), on the wheel (e.g., during a high-speed vehicular pursuit), or on a suspect (e.g., when the police officer is securing a suspect). The approach of limiting the predetermined audio command(s) may simplify the comparison of the first portion of the audio input to the predetermined audio command(s) such that the first portion may not be compared to the predetermined audio command(s) that are not found in the subset of the predetermined audio command(s). Accordingly, the accuracy of matching audio input to predetermined audio command(s) may be increased. In addition, inadvertent audio input of predetermined audio command(s) may be reduced.

Referring now to FIG. 1, there is provided a perspective view of an example battery-operated communication device 105 for temporary hands-free voice interaction, in accordance with some embodiments. Battery-operated communication device 105 may be a portable communication device that includes antenna 115 for sending and receiving communications, one or more microphones 120 for receiving audio input, one or more speakers 122 for outputting audio, touch-screen display 125, push-to-talk button 130, programmable buttons 135 and 140, and battery 142.

Battery-operated communication device 105 may be communicatively coupled via cable 160 to remote communication device 110 as part of communication system 100. Remote communication device 110 may be implemented, for example, as a remote speaker microphone or remote video camera. As shown, remote communication device 110 may include programmable buttons 145 and 155, push-to-talk button 150, one or more microphones 165, fixed button 170, and one or more speakers 175. Although two programmable buttons are shown, battery-operated communication device 105 and remote communication device 110 may include any suitable number of programmable buttons to be assigned a particular function, such as to exit hands-free operation by generating a trigger.

Antenna 115 of battery-operated communication device 105 may communicate using one or more communication standards including, but not limited to, radio communication and wireless communication. Battery-operated communication device 105 may support one or more types of transmission for communications, including but not limited to a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In some embodiments, devices may support a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

Battery 142 of battery-operated communication device 105 may be embedded in, or removable from, battery-operated communication device 105. In various embodiments, one or more microphones, such as one or more microphones 120 of battery-operated communication device 105 or one or more microphones 165 of remote communication device 110, may be used to receive audio input for voice communications including, but not limited to voice interactions for hands-free operation. One or more portions of the audio input may correspond to a temporary wake word, predetermined audio command(s), or other voice interaction information. For example, first portion of the audio input may include predetermined audio command(s) and a second portion of the audio input may include a temporary wake word. The second portion of the audio input may be received prior to the first portion of the audio input, which may enable hands-free operation to identify predetermined audio command(s) and avoid unintentional input of predetermined audio command(s). Skilled artisans will appreciate that the first and second portions of the audio input may be received separately or together in the same audio input.

In various embodiments, touch-screen display 125 of battery-operated communication device 105 may include a display and touch input interface for control and interaction with battery-operated communication device 105, such as to respond to a notification to initiate or exit hands-free operation or the assignment of a temporary wake word. In public-safety and mission-critical environments, touch-screen display 125 may be implemented to operate with gloves or other protective equipment. However, the hands of a user in such environments may be occupied by other activities, such as placing the user's hands on a patient or suspect or using the user's hands to pursue a suspect. In such scenarios, the user may not be able to use touch-screen display 125.

Hands-free operation of battery-operated communication device 105 or remote communication device 110 may be triggered by a remote user request, an event condition, a location condition, or any combination of a remote user request, event condition, and location condition. When the trigger corresponds to a remote user request, a dispatcher may enable hands-free operation for a user of a device (e.g., battery-operated communication device 105), all users assigned to an incident (e.g., a high-speed pursuit of a suspect), all users assigned to a role for an incident (e.g., special weapons and tactics team member or emergency medical technician), or any combination thereof. The trigger corresponding to the remote user request from the dispatcher may be received by battery-operated communication device

105 via antenna 115 independent of any action taken by a user of battery-operated communication device 105. Thus, the remote user request may result in hands-free operation being initiated without user interaction.

When the trigger to enable hands-free operation corresponds to an event condition, there may be a change in the state of a vehicle, a status of a user, a state of a user, or any combination thereof. A vehicle associated with the user of battery-operated communication device 105 may include a computer having multiple states. Each state of the vehicle may indicate one or more activities or status for the vehicle including, but not limited to, a stationary vehicle, moving vehicle, high-speed moving vehicle (e.g., corresponding to pursuit of a suspect or rapid movement toward an incident), public-safety or mission-critical lights engaged on the vehicle, and audible public-safety or mission-critical sirens engaged on the vehicle. The status of the user may correspond to operational information about the user including, but not limited to, the user having hands on a patient or suspect and the user having arrived on a scene of an incident. The state of the user may correspond to movement biometric information about the user including, but not limited to, the user having an elevated heart rate and the user running. The trigger corresponding to the event condition from the change in state or status of the vehicle or user may be received by battery-operated communication device 105 via antenna 115 or another wired or wireless interface. Thus, the event condition may result in hands-free operation being initiated without user interaction.

When the trigger to enable hands-free operation corresponds to a location condition, the location condition may represent the arrival of a user on a location of an incident, which may be indicated by a dispatcher, a location of the user matching the location of the incident, the arrival of the user on the location of the incident before other users, or any combination thereof. The dispatcher may indicate the arrival of a user on a location of an incident which may trigger hands-free operation. The location of the user may be determined by any suitable information about the user, such as the global positioning system (GPS) coordinates of a device or vehicle associated with the user or the user's location as indicated by a dispatcher. When the location of the user corresponds to the location of the incident, a trigger may be generated within battery-operated communication device 105 and received internal to the device, or within a remote device and sent by the device to be received by battery-operated communication device 105 using antenna 115 or another wired or wireless interface. In at least some embodiments, battery-operated communication device 105 or another device that is remote to battery-operated communication device 105 may determine that the user arrived on the location of the incident before other users and a trigger may be received by battery-operated communication device 105 internally or using antenna 115 or another wired or wireless interface. Thus, the location condition may result in hands-free operation being initiated without user interaction.

In some embodiments, hands-free operation may be initiated or exited by pressing a button. For example, one of the buttons of battery-operated communication device 105, such as push-to-talk button 130 or one of the programmable buttons 135 and 140, may be pressed to initiate or exit hands-free operation. Although hands-free operation can be controlled by a button on battery-operated communication device 105, one of the buttons of remote communication device 110, such as push-to-talk button 150 or one of the programmable buttons 145 and 155, may also be used. However, in many public-safety or mission-critical environments, the hands of the user are not available to initiate or exit hands-free operation by pressing a button. In such situations, hands-free operation may be initiated after a processor of the battery-operated communication device 105 receives a trigger corresponding to a remote user request, event condition, location condition, or any combination of a remote user request, event condition, and location condition.

Figure 2:
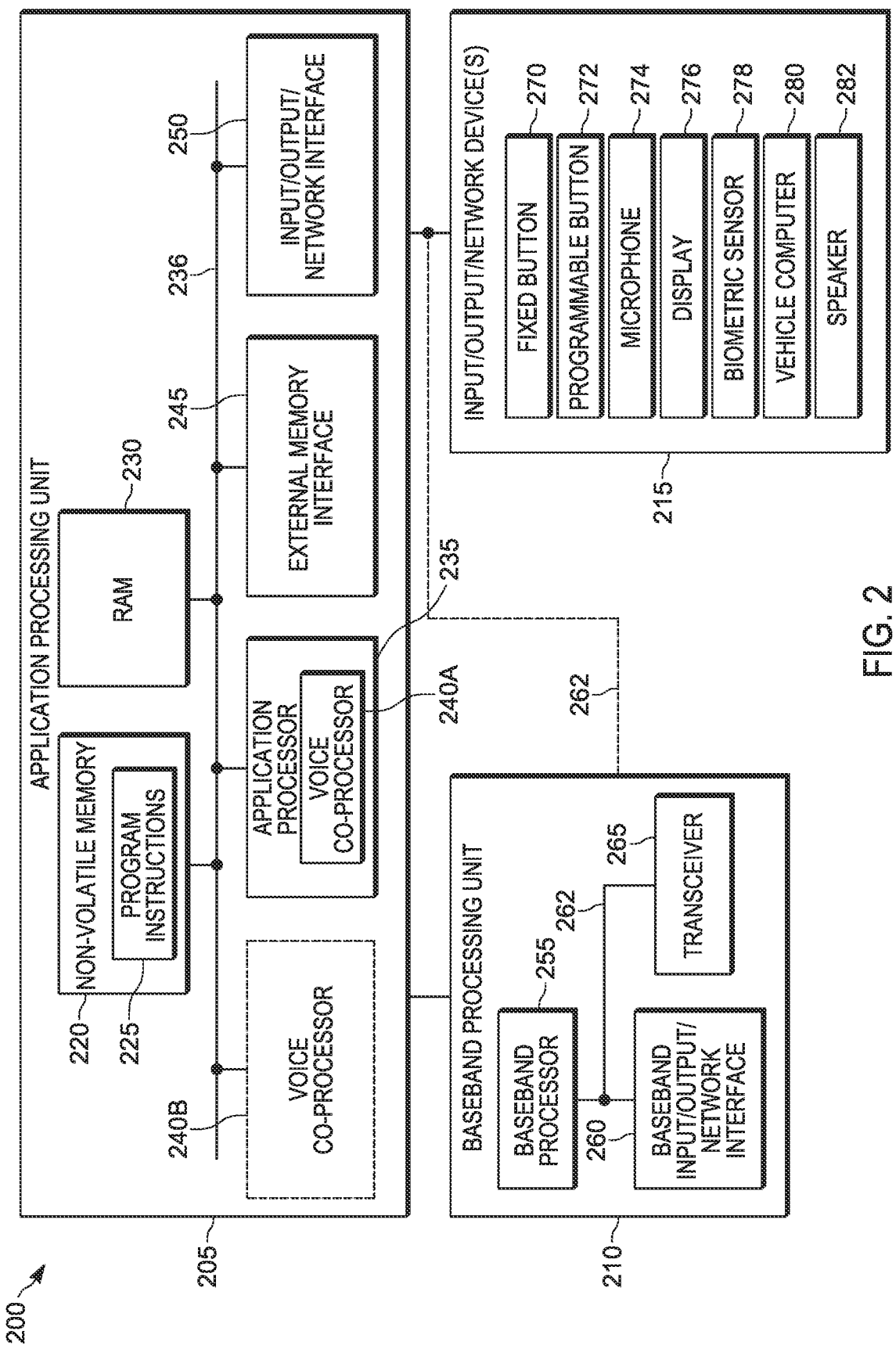
FIG. 2 is a block diagram illustrating selected elements of an example battery-operated communication device for temporary hands-free voice interaction, in accordance with some embodiments.

Referring now to FIG. 2, there is provided a block diagram illustrating selected elements of an example battery-operated communication device 200 for temporary hands-free voice interaction, in accordance with some embodiments. Battery-operated communication device 200 may include application processing unit 205, baseband processing unit 210, and input/output/network device(s) 215. Application processing unit 205 may be communicatively coupled to baseband processing unit 210 and input/output/network device(s) 215 via any suitable interface. In at least some embodiments, application processing unit 205 may include an application processor 235, a voice co-processor 240A or 240B, a non-volatile memory 220, a random access memory (RAM) 230, an input/output/network interface 250, and an external memory interface 245, all of which may be coupled to a system bus 236 through which they communicate with each other. In various embodiments, application processor 235 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware elements of battery-operated communication device 200. In some embodiments, application processor 235 may include voice co-processor 240A for hands-free operation. Although skilled artisans will appreciate that the voice co-processor may be external to application processor 235, such as voice co-processor 240B. Voice co-processor 240A or 240B may enable voice interactions associated with hands-free operation to be processed without the use of application processor 235, which may enable application processor 235 to be powered down or placed in a low-power state to reduce the power drain on the battery of battery-operated communication device 200.

Non-volatile memory 220 may be implemented using any suitable storage medium such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. RAM 220 may, from time to time, store data representing inputs to one or more methods illustrated in FIG. 3A, FIG. 3B, FIG. 3C, FIG. 3D, FIG. 4A and FIG. 4B, such as data received from one or more of input/output/network device(s) 215 through input/output/network interface 250. RAM 220 may also store data used in performing other functions of the battery-operated communication device 200.

In at least some embodiments, non-volatile memory 220 may store program instructions 225, at least some of which may be executed by application processor 235 or voice co-processor 240A or 240B to perform one or more steps of the methods described herein. For example, at least some of the operations of method 300A illustrated in FIG. 3A, operations of method 300B illustrated in FIG. 3B, operations of method 300C illustrated in FIG. 3C, operations of method 300D illustrated in FIG. 3D, operations of method 400A illustrated in FIG. 4A, or operations of method 400B illustrated in FIG. 4B may be performed by program instructions executing on application processor 235 or voice co-processor 240A or 240B. In some embodiments, program instructions 225 may include program instructions that when executed on application processor 235 or voice co-processor 240A or 240B implement other functionality features of battery-operated communication device 200.

In at least some embodiments, application processing unit 205 may be communicatively coupled to baseband processing unit 210, which may include baseband processor 255 and baseband input/output/network interface 260. Any suitable interface may be used to communicatively couple baseband processing unit 210 to application processing unit 205. For example, baseband processing unit 210 may be communicatively coupled to bus 236 of application processing unit 205. As another example, baseband processing unit 210 may be communicatively coupled to application processing unit 205 over a network to input/output/network interface 250 of application processing unit 205. As a further example, baseband processing unit 210 may be communicatively coupled directly to application processor 235 of application processing unit 205.

In various embodiments, baseband processing unit 210 may include baseband processor 255 communicatively coupled via bus 262 to baseband input/output/network interface 260 and transceiver 265. Baseband processor 255 may execute a real-time operation system to support public-safety and mission-critical communications without in determinant delays in processing incoming or outgoing communications, including but not limited to one or more communications over high-powered land mobile radio (LMR), public safety long-term evolution (PS LTE), and mission critical push-to-talk over long-term evolution (MSPTT over LTE). Baseband input/output/network interface 260 may operate in a similar manner as input/output/network interface 250 of application processing unit 205. Input/output/network device(s) 215 may be coupled to baseband input/output/network interface 260 via application processing unit 205 or optionally via connection 262.

Transceiver 265 of baseband processing unit 210 may, at various times, receive audio communications for playback over a speaker, such as speaker 122 as described for FIG. 1, or transmit audio captured using one or more microphones, such as microphones 120 and 165 as described for FIG. 1. An incoming audio signal may be received by transceiver 265, processed by baseband processor 255, optionally sent to one or more components of application processing unit 205, such as application processor 235, for further processing, and output as audio on a speaker, such as speaker 282. In various embodiments, transceiver 265 may be or include a land mobile radio (LMR) transceiver, a long term evolution (LTE) transceiver, a WiFi transceiver, or another type of audio transceiver. Although transceiver 265 is shown external to baseband processor 255, baseband processor 255 may integrate transceiver 265.

In at least some embodiments, input/output/network interface 250 may include one or more analog input interfaces, such as interfaces using one or more A/D converters, or digital interfaces for receiving signals or data usable in performing the methods described herein. For example, input/output/network interface 250 may include interfaces through which application processing unit 205 may be coupled to other elements battery-operated communication device 200, such as input/output/network device(s) 215.

In the illustrated example, application processing unit 205 is shown coupled to a fixed button 270, a programmable button 272, a microphone 274, a display 276, a biometric sensor 278, a vehicle computer 280, and a speaker 282. Fixed button 270 and programmable button 272 may be pressed by a user and provide user input in the form of a digital signal for processing by application processing unit 205. Microphone 274 may be implemented as one or more microphones, which may provide audio input in the form of a digital signal for application processing unit 205 for voice communications including, but not limited to voice interactions for hands-free operation. Display 276 may output data from application processing unit 205 and may provide touch-based user input from a touch-screen for processing by application processing unit 205. Biometric sensor 278 may be implemented as one or more sensors for measuring health information associated with a user, including, but not limited to, measuring the heart rate of a user. Application processing unit 205 may compare the measured health information to a known metric to determine whether the user is performing a particular activity. For example, a user running on foot may exhibit an elevated heart rate above a known metric for the user, such as the number of beats per minute associated with an elevated heart rate for running. The known metric may be set based on a suitable baseline for the user, such as the user's age. Vehicle computer 280 may be communicatively coupled to application processing unit 205 via a network, such as a wireless network. In at least some embodiments, vehicle computer 280 may provide information associated with a user of the battery-operated communication device 200, such as the location of the user and the status of the vehicle.

In some embodiments, application processing unit 205 may be coupled to input/output/network device(s) 215 that implement one or more of a microphone (e.g., microphone 274), or a speaker (e.g., speaker 282), such as those illustrated in FIG. 1 and described above. In at least some embodiments, application processing unit 205 may be coupled to input/output/network device(s) 215 that implement other functionality features of battery-operated communication device 200, such as a keyboard, a mouse, a touch panel, a switch, an additional microphone, a video camera, a display (e.g., display 276), an additional speaker, an infrared sensor, one or more other sensors (e.g., biometric sensor 278), and the like over input/output/network interface 250.

Any or all of these input/output/network device(s) 215 may be configured to send data to or receive data from application processing unit 205 over one or more data lines through input/output/network interface 250, in various embodiments. Similarly, any or all of these input/output/network device(s) 215 may be configured to assert or receive a control signal from application processing unit 205 over one or more connections through input/output/network interface 250. In response to receiving various inputs from input/output/network device(s) 215, the application processor 235 or voice co-processor 240A or 240B may execute program instructions to determine how, when, and whether to configure one or more components of battery-operated communication device 200, including but not limited to one or more microphones and one or more speakers, based on the status of a remote audio device, such as remote communication device 110 as described for FIG. 1.

External memory interface 245 may include one or more interfaces through which application processing unit 205 may be coupled to an external memory (not shown). Such an external memory may include, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3A:
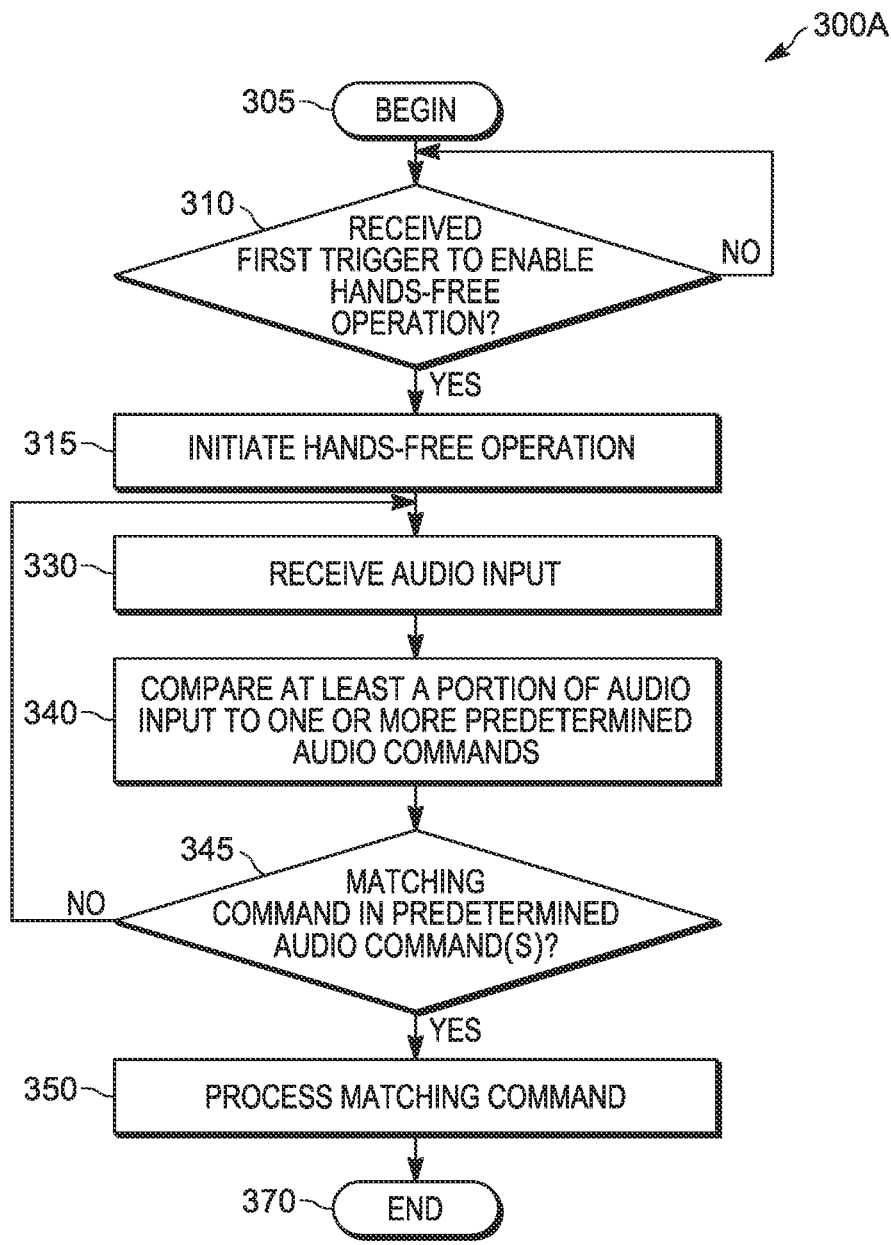
FIG. 3A is a flowchart illustrating selected elements of an example method for temporary hands-free voice interaction, in accordance with some embodiments.

Referring now to FIG. 3A, there is provided a flowchart illustrating selected elements of an example method 300A for temporary hands-free voice interaction, in accordance with some embodiments. While a particular order of operations is indicated in FIG. 3A for illustrative purposes, the timing and ordering of such operations may vary where appropriate without negating the purpose and advantages of the examples set forth in detail throughout the remainder of this disclosure. For example, method 300A may operate periodically for hands-free operation.

In this example embodiment, method 300A begins with block 305 in FIG. 3A and continues with block 310, where a first trigger to enable hands-free operation may be received. The first trigger may correspond to a first remote user request, a first event condition, a first location condition, or any combination of a first remote user request, first event condition, and first location condition. The first trigger may be received by a processor of battery-operated communication device (e.g., application processor 235 as described for FIG. 2) independent of any action taken by a user of the battery-operated communication device, which may support requests to enable hands-free operation without user interaction. When the first trigger received corresponds to first remote user request, first event condition, first location condition, or any suitable combination thereof, method 300A may proceed to block 315. Otherwise, method 300A may return to block 310.

When the first trigger corresponds to a remote user request, a dispatcher may enable hands-free operation for a user of a device (e.g., battery-operated communication device 105 as described for FIG. 1), all users assigned to an incident (e.g., all users in a high-speed pursuit of a suspect), all users assigned to a role for an incident (e.g., special weapons and tactics team member or emergency medical technician for an incident), or any combination thereof. When the first trigger to enable hands-free operation corresponds to an event condition, there may be a change in the state of a vehicle (e.g., a state for high-speed operation, engagement of vehicle lights and siren), a status of a user (e.g., user's hands on patient or suspect), a state of a user (e.g., elevated heart rate as measured by a biometric sensor such as biometric sensor 278 as described for FIG. 2), or any combination thereof. When the trigger to enable hands-free operation corresponds to a location condition, the location condition may represent the arrival of a user on a location of an incident, which may be indicated by a dispatcher, a location of the user matching the location of the incident, the arrival of the user on the location of the incident before other users, or any combination thereof.

At block 315, hands-free operation may be initiated on the battery-operated communication device. Hands-free operation may enable the battery-operated communication device to respond to voice interactions independent of any physical input from a user. At block 330, audio input may be received by a processor of the battery-operated communication device, such as application processor 235 or voice co-processor 240A or 240B of application processing unit 205 as described for FIG. 2. The audio input may be received after the battery-operated communication device waits for audio input. A microphone of the battery-operated communication device, such as microphone 120 as described for FIG. 1 or microphone 274 as described for FIG. 2, may be used for the audio input received by the processor of the battery-operated communication device. In various embodiments, the audio input may be received after hands-free operation is initiated.

At block 340, at least a first portion of the audio input may be compared to one or more predetermined audio commands. The predetermined audio command(s) may enable users in public-safety or mission-critical environments to perform one or more tasks including, but not limited to, changing or querying communication zones or communication channels of the battery-operated communication device, changing or querying the volume of the battery-operated communication device, changing the radio profile, and querying information about the battery of the battery-operated communication device.

At block 345, it may be determined whether the first portion of the audio input that was compared to predetermined audio command(s) corresponds to at least a matching command of the predetermined audio command(s). A matching command may correspond to the first portion of audio input without exactly matching the first portion. Skilled artisans will appreciate that the first portion may correspond to the matching command in any suitable manner, including but not limited to a partial match and a probability of a match being above a threshold.

When there is no matching command at block 345, method 300A may proceed to block 330 where the battery-operated communication device may wait again to receive audio input. Otherwise, when there is a matching command, method 300A may proceed to block 350, where a processor of the battery-operated communication device may process the matching command. Processing of the command may require querying information and outputting the information to a user (e.g., displayed or played back over a speaker) or configuring one or more components of battery-operated communication device, such as transceiver 265 of baseband processing unit 210 as described for FIG. 2. One or more processors may process the matching command, such as application processor 235 or voice co-processor 240A or 240B of application processing unit 205 as described for FIG. 2 or baseband processor 255 of baseband processing unit 210 as described for FIG. 2. In at least some embodiments, one or more processors in battery-operated communication device may process a command using one or more external processors communicatively coupled to the device. In at least some embodiments, a notification about the matching command may be output to notify a user of the device that a match was found. The notification may be any suitable notification or group of notifications including, but not limited to, a visual notification output on a display or an audio notification output from a speaker. The notification may be output before, after, or in parallel with processing the matching command. Method 300A may then end at block 370.

Figure 3B:
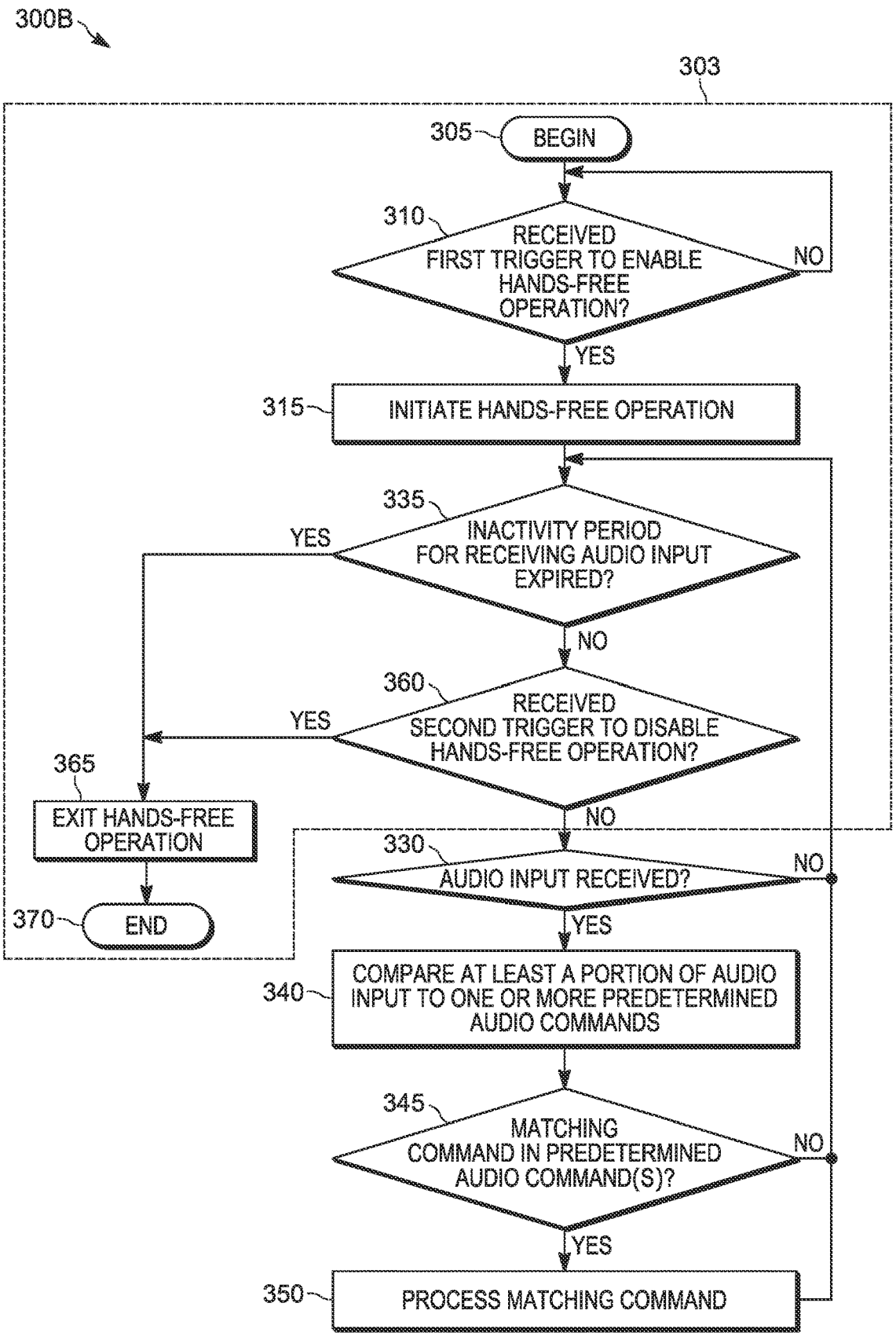
FIG. 3B is a flowchart illustrating selected elements of an example method for initiating and exiting temporary hands-free voice interaction, in accordance with some embodiments.

Referring now to FIG. 3B, there is provided a flowchart illustrating selected elements of an example method 300B for initiating and exiting temporary hands-free voice interaction, in accordance with some embodiments. While a particular order of operations is indicated in FIG. 3B for illustrative purposes, the timing and ordering of such operations may vary where appropriate without negating the purpose and advantages of the examples set forth in detail throughout the remainder of this disclosure. For example, method 300B may periodically initiate and exit hands-free operation. As another example, method 300B may exit hands-free operation at any time after initiating hands-free operation.

In this example embodiment, method 300B begins with block 305 in FIG. 3B and continues with block 310, where a first trigger to enable hands-free operation may be received. Block 310 of FIG. 3B may be implemented similar to block 310 as described for FIG. 3A in which the first trigger may correspond to a first remote user request, a first event condition, a first location condition, or any combination of a first remote user request, first event condition, and first location condition. When the first trigger received corresponds to the first remote user request, event condition, location condition, or any suitable combination thereof, method 300B may proceed to block 315. Otherwise, method 300B may return to block 310. At block 315, hands-free operation may be initiated on the battery-operated communication device, similar to block 315 as described for FIG. 3A.

At block 335, it may be determined whether an inactivity period for receiving audio input has expired. The inactivity period may be initially set to a predetermined default value, such as five minutes, or may be dynamically configured for a particular user or a battery-operated communication device. In various embodiments, the inactivity period may prevent inadvertent hands-free operation and reduce power drain from the battery-operated communication device by disabling hands-free operation when not in use. When the inactivity period has not expired, method 300B may proceed to block 360. Otherwise, when the inactivity period has expired, method 300B may proceed to block 365.

At block 360, it may be determined whether a second trigger to disable hands-free operation is received. In various embodiments, the second trigger may be received after the first trigger to enable hands-free operation. The second trigger may correspond to a second remote user request, a second event condition, a second location condition, or any combination of a second remote user request, second event condition, and second location condition. In various embodiments, the second remote user request, second event condition, and second location condition may be similar to the first remote user request, first event condition, and first location condition, as described herein. For example, when the second trigger to exit hands-free operation corresponds to the second event condition, there may be a change in the state of a vehicle (e.g., a state for normal-speed operation, disengagement of vehicle lights and siren), a status of the user (e.g., user's hands no longer on patient or suspect), or a state of the user (e.g., non-elevated heart rate as measured by a biometric sensors such as biometric sensor 278 as described for FIG. 2). As another example, when the second trigger to exit hands-free operation corresponds to the second location condition, the location condition may represent the departure of a user from the location of an incident, which may be indicated by a dispatcher, or the location of the user no longer matching the location of the incident (e.g., the location of the user beyond a geographic fence around the location of the incident). The initiation of and exit from hands-free operation may be performed without a local user request. The local user request may indicate that a user has pressed a button or toggled a switch on the battery-operated communication device or that a voice command from the user has been received using the microphone of the battery-operated communication device.

When a second trigger is received to disable hands-free operation, method 300B may proceed to block 365, where hands-free operation may exit to end hands-free voice interactions with the battery-operated communication device. When hands-free operation exits, inadvertent activation of voice interactions may be avoided and excessive power drain of the battery of the battery-operated communication device may be reduced or eliminated. Method 300B may end at block 370. As illustrated in FIG. 3B, blocks 305, 310, 315, 335, 360, 365, and 370 may be referred to as block 303, which may include the flow between the blocks.

Otherwise, when a second trigger is not received to disable hands-free operation, method 300B may proceed to block 330, where it may be determined whether audio input has been received. Audio input may be received by a processor of the battery-operated communication device, such as application processor 235 or voice co-processor 240A or 240B of application processing unit 205 as described for FIG. 2. In some embodiments, the audio input may be received after the battery-operated communication device waits for audio input. A microphone of the battery-operated communication device, such as microphone 120 as described for FIG. 1 or microphone 274 as described for FIG. 2, may be used for the audio input received by the processor of the battery-operated communication device. In various embodiments, the audio input may be received after hands-free operation is initiated. When audio input is received, method 300B may proceed to block 340. Otherwise, method 300B may return to block 335, where it may be determined whether an inactivity period for receiving audio input has expired.

At block 340, at least a first portion of the audio input may be compared to one or more predetermined audio commands. Block 340 of FIG. 3B may be similar to block 340 as described for FIG. 3A. At block 345, it may be determined whether the first portion of the audio input that was compared to predetermined audio command(s) corresponds to at least a matching command of the predetermined audio command(s). Block 345 of FIG. 3B may be similar to block 345 as described for FIG. 3B.

When there is a matching command, method 300B may proceed to block 350, where the matching command may be processed similar to block 350 as described for FIG. 3A and continue to block 335. When there is no matching command at block 345, method 300B may return to block 335, where it may be determined whether an inactivity period for receiving audio input has expired.

Figure 3C:
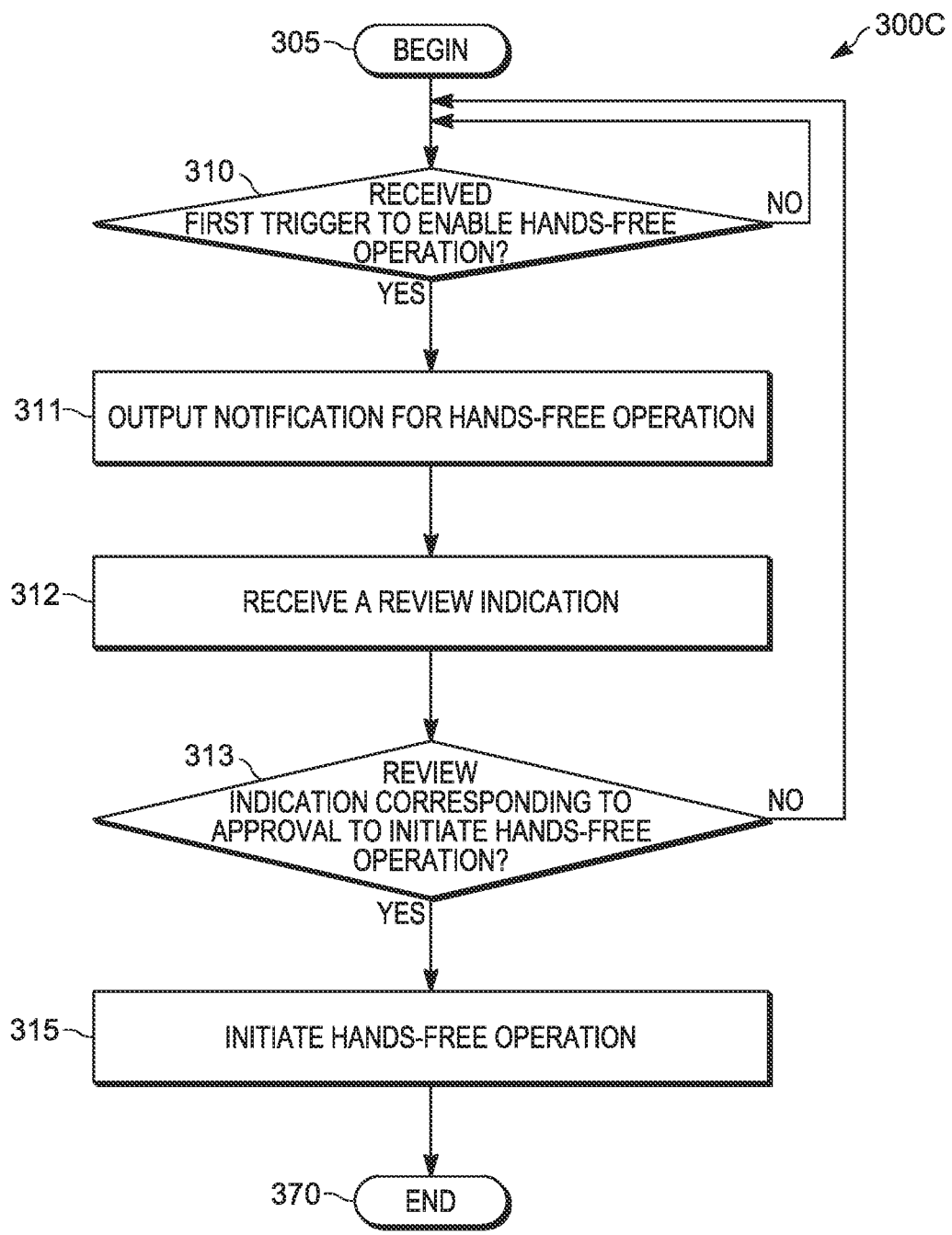
FIG. 3C is a flowchart illustrating selected elements of an example method for notification and acceptance of temporary hands-free voice interaction, in accordance with some embodiments.

Referring now to FIG. 3C, there is provided a flowchart illustrating selected elements of an example method 300C for notification and acceptance of temporary hands-free voice interaction, in accordance with some embodiments. While a particular order of operations is indicated in FIG. 3C for illustrative purposes, the timing and ordering of such operations may vary where appropriate without negating the purpose and advantages of the examples set forth in detail throughout the remainder of this disclosure. For example, method 300C may operate periodically for hands-free operation. As another example, method 300C may initiate hands-free operation before outputting a notification for hands-free operation and exit hands-free operation at any time after initiating hands-free operation.

In this example embodiment, method 300C begins with block 305 in FIG. 3C and continues with block 310, where a first trigger to enable hands-free operation may be received. Similar to the first trigger described for block 310 of FIG. 3A, the first trigger may correspond to a first remote user request, a first event condition, a first location condition, or any suitable combination thereof. When a first trigger is received to enable hands-free operation, method 300C may proceed to block 311, where a notification for hands-free operation may be output. Otherwise, method 300C may return to block 310. The output of the notification may be provided to the user in an audio or visual manner.

For example, a visual indication may be output on a display, such as on display 125 as described for FIG. 1 or display 276 as described for FIG. 2. As another example, an audio indication may be output on a speaker, such as on speaker 122 as described for FIG. 1 or speaker 282 as described for FIG. 2. Skilled artisans will appreciate that a notification may be provided in any suitable combination of audio and visual indications.

At block 312, a review indication corresponding to an approval or a rejection to initiate hands-free operation may be received in response to the notification for hands-free operation. The review indication may be provided by input from a local user of the battery-operated communication device (e.g., emergency medical technician) or a remote user of the battery-operated communication device (e.g., a dispatcher). The review indication may also be provided automatically when a period of time elapses after notification is provided. In at least some embodiments, the period of time may be predetermined.

At block 313, it may be determined whether the review indication corresponds to an approval to initiate hands-free operation. When the review indication corresponds to an approval, method 300C may proceed to block 315 where initiation of the hands-free operation may be based on the approval to initiate hands-free operation. Otherwise, when the review indication corresponds to a rejection, method 300C may proceed to block 310 where a battery-operated communication device may again determine whether a first trigger has been received to enable hands-free operation.

When hands-free operation is initiated, audio input received by the battery-operated communication device using a microphone, such as microphone 120 as described for FIG. 1 or microphone 274 as described for FIG. 2, may be implemented by the hands-free operation listening for the audio input. Listening for audio input may be implemented by a voice processor (e.g., voice co-processor 240A or 240B as described for FIG. 2) that may remain powered to process audio input when the primary processor (e.g., application processor 235 as described for FIG. 2) is powered down or placed in a low power mode in which the primary processor does not execute instructions. Using a voice processor to listen for audio input using a microphone may reduce power drain of the battery of the battery-operated communication device during hands-free operation. Method 300C may end at block 370.

Figure 3D:
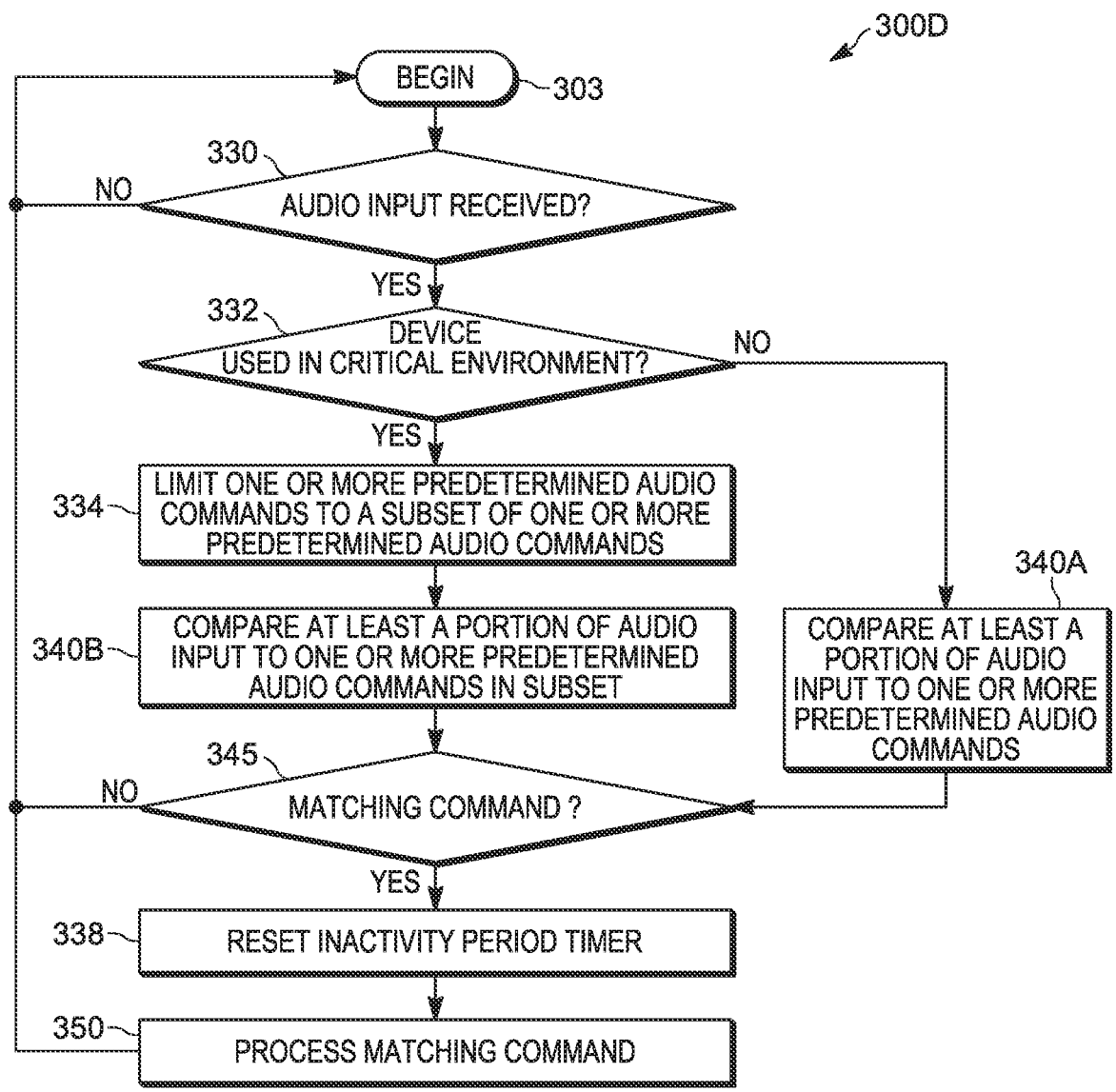
FIG. 3D is a flowchart illustrating selected elements of an example method for temporary hands-free voice interaction in a critical environment, in accordance with some embodiments.

Referring now to FIG. 3D, there is provided a flowchart illustrating selected elements of an example method 300D for temporary hands-free voice interaction in a critical environment, in accordance with some embodiments. While a particular order of operations is indicated in FIG. 3C for illustrative purposes, the timing and ordering of such operations may vary where appropriate without negating the purpose and advantages of the examples set forth in detail throughout the remainder of this disclosure. For example, method 300D may initiate hands-free operation periodically. As another example, method 300D may limit the predetermined audio command(s) to a subset at any time when hands-free operation is initiated.

In this example embodiment, method 300D begins with block 303 in FIG. 3D and continues with block 330. Similar to block 303 as described for FIG. 3B, block 303 in FIG. 3D may include receiving a first trigger at block 310, initiating hands-free operation at block 315, determining whether an inactivity period for receiving audio input has expired at block 335, determining whether a second trigger was received to disable hands-free operation at block 360, exiting hands-free operation at block 365, and ending at block 370.

At block 330, it may be determined whether audio input has been received, similar to block 330 as described for FIG. 3B. When audio input is received, method 300D may proceed to block 332. Otherwise, method 300D may return to block 335, as described for block 335 in block 303 of FIG. 3B.

At block 332, it may be determined whether the battery-operated communication device is used or will be used in a critical environment. A critical environment may include environments in which hands-free operation is typically not able to be manually activated by, for example, the press of a button. For example, a critical environment for an emergency medical technician may include situations in which the emergency medical technician keeps both hands on a patient or has biological material (e.g., blood) on the gloves of the emergency medical technician. As another example, a critical environment for a police officer may include situations in which the police officer keeps both hands free (e.g., during a foot chase), on the wheel (e.g., during a high-speed vehicular pursuit), or on a suspect (e.g., when the police officer is securing a suspect).

When the battery-operated communication device is not used or will not be used in a critical environment, method 300D may proceed to block 340A, where at least a first portion of the audio input may be compared to one or more predetermined audio commands. The predetermined audio command(s) may enable users in public-safety or mission-critical environments to perform one or more tasks including, but not limited to, changing or querying communication zones or communication channels of the battery-operated communication device, changing or querying the volume of the battery-operated communication device, changing the radio profile, and querying information about the battery of the battery-operated communication device.

When the battery-operated communication device is used or will be used in a critical environment, method 300D may proceed to block 334, where the predetermined audio commands may be limited to a subset of the predetermined audio commands to simplify voice interactions in critical environments, which may improve the accuracy of matching a portion of the audio input to a predetermined audio command. For example, predetermined audio commands to query information from the device may not be available in critical environments in which the subset of commands is limited to configuration commands, such as changing the communication zone or communication channel of the battery-operated communication device.

At block 340B, at least a first portion of the audio input may be compared to one or more predetermined audio commands in the subset, which may enable users in public-safety or mission-critical environments in critical environments to perform one or more tasks including, but not limited to, changing or querying communication zones or communication channels of the battery-operated communication device, changing or querying the volume of the battery-operated communication device, and querying information about the battery of the battery-operated communication device. Because the one or more predetermined audio commands may be limited to the subset, the comparison may not compare the first portion of the audio input to the one or more predetermined audio commands that are not found in the subset of the one or more predetermined audio commands. The approach of limiting the predetermined audio commands may simplify the comparison of the first portion of the audio input to the predetermined audio commands such that the first portion may not be compared to the predetermined audio commands that are not found in the subset of the predetermined audio commands. Accordingly, the accuracy of matching audio input to predetermined audio commands may be increased. In addition, inadvertent audio input of predetermined audio commands may be reduced.

At block 345, it may be determined whether there is a matching command. When method 300D proceeds from block 340A, the first portion of the audio input that was compared to the predetermined audio command(s) may correspond to at least a matching command of the predetermined audio command(s). When method 300D proceeds from block 340B, the first portion of the audio input that was compared to the subset of predetermined audio command(s) corresponds to at least a matching command of the subset of predetermined audio command(s). A matching command may correspond to the first portion of audio input without exactly matching the first portion. Skilled artisans will appreciate that the first portion may correspond to the matching command in any suitable manner, including but not limited to a partial match and a probability of a match being above a threshold.

When there is a matching command, method 300D may proceed to block 338, where the inactivity period timer for receiving audio input is reset. The inactivity period timer may be reset to any suitable value, such as reset to a zero value for incrementing the inactivity period timer or reset to a non-zero value for decrementing the inactivity period timer. At block 350, a processor of the battery-operated communication device may process the matching command. Processing of the command may require querying information and outputting the information to a user (e.g., displayed or played back over a speaker) or configuring one or more components of battery-operated communication device, such as transceiver 265 of baseband processing unit 210 as described for FIG. 2. In at least some embodiments, a notification about the matching command may be output to notify a user of the device that a match was found. The notification may be any suitable notification or group of notifications including, but not limited to, a visual notification output on a display or an audio notification output from a speaker. The notification may be output before, after, or in parallel with processing the matching command. Method 300D may then proceed to block 335, as described for block 335 in block 303 of FIG. 3B.

Figure 4A:
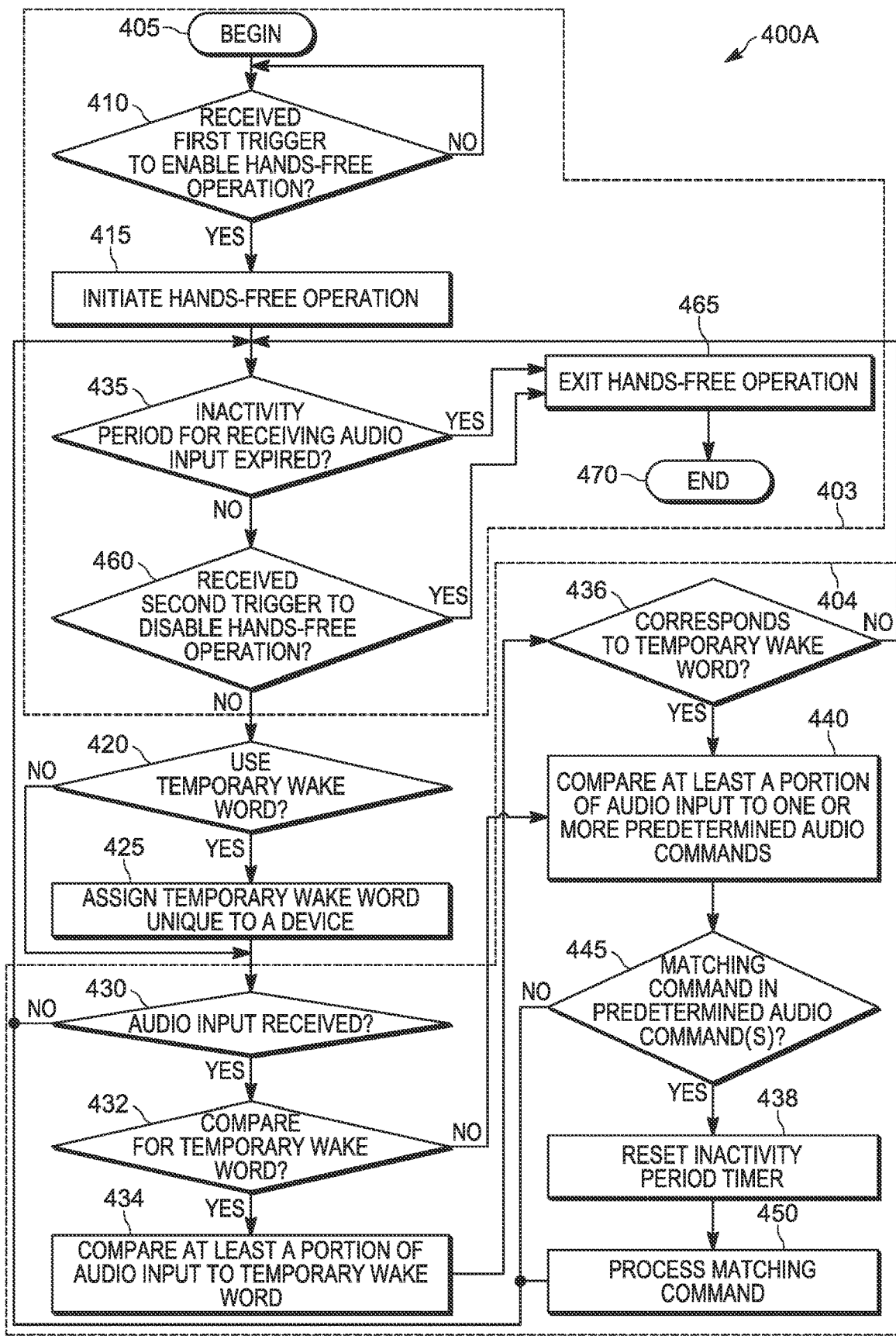
FIG. 4A is a flowchart illustrating selected elements of an example method for temporary hands-free voice interaction with a temporary wake word, in accordance with some embodiments.

Referring now to FIG. 4A, there is provided a flowchart illustrating selected elements of an example method 400A for temporary hands-free voice interaction with a temporary wake word, in accordance with some embodiments. While a particular order of operations is indicated in FIG. 4A for illustrative purposes, the timing and ordering of such operations may vary where appropriate without negating the purpose and advantages of the examples set forth in detail throughout the remainder of this disclosure. For example, method 400A may initiate temporary hands-free voice interaction periodically. As another example, method 400A may exit hands-free operation at any time after initiating hands-free operation. As a further example, method 400A may process a matching command while receiving subsequent audio input.

In this example embodiment, method 400A begins with block 405 in FIG. 4A and continues with block 410, where a first trigger to enable hands-free operation may be received. Similar to block 310 as described for FIG. 3A, the first trigger may correspond to a first remote user request, a first event condition, a first location condition, or any suitable combination thereof. When the first trigger received corresponds to first remote user request, a first event condition, a first location condition, or any suitable combination thereof, method 400A may proceed to block 415. Otherwise, method 400A may return to block 410.

At block 415, hands-free operation may be initiated on the battery-operated communication device. Hands-free operation may enable the battery-operated communication device to respond to voice interactions independent of any physical input from a user.

At block 435, it may be determined whether an inactivity period for receiving audio input has expired. The inactivity period may be initially set to a predetermined default value, such as five minutes, or may be dynamically configured for a particular user or battery-operated communication device. In various embodiments, the inactivity period may prevent inadvertent hands-free operation and reduce power drain from the battery-operated communication device by disabling hands-free operation when not in use. When the inactivity period has not expired, method 400A may proceed to block 460. Otherwise, when the inactivity period has expired, method 400A may proceed to block 465.

At block 460, it may be determined whether a second trigger to disable hands-free operation is received. In various embodiments, the second trigger may be received after the first trigger to enable hands-free operation. The second trigger may correspond to a second remote user request, a second event condition, a second location condition, or any suitable combination thereof. In various embodiments, the second remote user request, second event condition, and second location condition may be similar to the first remote user request, first event condition, and first location condition, as described herein. For example, when the second trigger to exit hands-free operation corresponds to the second event condition, there may be a change in the state of a vehicle (e.g., a state for normal-speed operation, disengagement of vehicle lights and siren), a status of the user (e.g., user's hands no longer on patient or suspect), or a state of the user (e.g., non-elevated heart rate as measured by a biometric sensors such as biometric sensor 278 as described for FIG. 2). As another example, when the second trigger to exit hands-free operation corresponds to the second location condition, the location condition may represent the departure of a user from the location of an incident, which may be indicated by a dispatcher, or the location of the user no longer matching the location of the incident (e.g., the location of the user beyond a geographic fence around the location of the incident). The initiation of and exit from hands-free operation may be performed without a local user request. The local user request may indicate that a user has pressed or activated a button (e.g., programmable button 135 or 140 as described for FIG. 1) or toggled a switch on the battery-operated communication device or that a voice command from the user has been received using the microphone of the battery-operated communication device.

When a second trigger is received to disable hands-free operation, method 400A may proceed to block 465, where hands-free operation may exit to end hands-free voice interactions with the battery-operated communication device. When hands-free operation exits, inadvertent activation of voice interactions may be avoided and excessive power drain of the battery of the battery-operated communication device may be reduced or eliminated. Method 400A may end at block 470. As illustrated in FIG. 4A, blocks 405, 410, 415, 435, 460, 465, and 470 may be referred to as block 403, which may include the flow between the blocks.

Otherwise, when a second trigger is not received to disable hands-free operation, method 400A may proceed to block 420, where it may be determined whether to use a temporary wake word for voice interaction during hands-free operation. When use of a temporary wake word is not enabled, method 400A may proceed to block 430. Otherwise, when the use of a temporary wake word is enabled, method 400A may proceed to block 425, where a temporary wake word may be assigned to the battery-operated communication device, or the user of the battery-operated communication device.

Rather than use a universal wake word for multiple battery-operated communication devices or multiple users of battery-operated communication devices, a temporary wake word is unique to a battery-operated communication device or a user of the battery-operated communication device. Multiple devices in proximity or communicating over common channels may avoid cross-talk and accidental audio input for hands-free operation by using a temporary wake word that is unique to each battery-operated communication device or the user of the battery-operated communication device. Skilled artisans will appreciate that it may be determined whether a temporary wake word is unique in various ways, including but not limited to, notifying the user of a battery-operated communication device to receive acceptance of the temporary wake word, receiving temporary wake word information from other communicatively coupled battery-operated communication devices to confirm whether the assigned temporary wake word is unique, and submitting the assigned temporary wake word to a server, dispatcher, or operator to confirm whether the assigned word is unique.

At block 430, it may be determined whether audio input has been received, for example, by a processor of the battery-operated communication device, such as application processor 235 or voice co-processor 240A or 240B of application processing unit 205 as described for FIG. 2. A microphone of the battery-operated communication device, such as microphone 120 as described for FIG. 1 or microphone 274 as described for FIG. 2, may be used for the audio input received by the processor of the battery-operated communication device. In various embodiments, the audio input may be received after hands-free operation is initiated.

When no audio input has been received, method 400A may return to block 435, where it may be determined whether an inactivity period for receiving audio input has expired. Otherwise, when audio input has been received, method 400A may proceed to block 432, where it may be determined whether to compare the audio input, or at least a portion of the audio input received, to the temporary wake word. When listening for a temporary wake word, battery-operated communication device may enable a voice processor, such as voice co-processor 240A or 240B as described for FIG. 2, and place the primary processor, such as application processor 235 as described for FIG. 2, in a powered down or low power mode. Using a voice processor instead of a primary processor may enable reduced power drain of the battery in the battery-operated communication device.

When it is determined that at least a portion of the audio input received will be compared to the temporary wake word, method 400A may proceed to block 434, where at least a portion of the audio input is compared to the temporary wake word. The portion of audio input compared to the temporary wake word may be a second portion of the audio input that is received before the first portion of the audio input that is compared to one or more predetermined audio commands.

At block 436, it may be determined whether the portion of audio input that is compared corresponds to the temporary wake word. In various embodiments, the determination may be whether the second portion of the audio input corresponds to the temporary wake word. In some embodiments, the second portion of the audio input may be received by the battery-operated communication device before the first portion of the audio input. A temporary wake word may correspond to the second portion of the audio input without exactly matching the second portion. Skilled artisans will appreciate that the second portion may corresponds to the temporary wake word in any suitable manner, including but not limited to a partial match and a probability of a match being above a threshold. When the temporary wake word corresponds to the portion that is compared, method 400A may proceed to block 440. Otherwise, when the temporary wake word does not correspond to the portion that is compared, method 400A may return to block 435 where it may be determined whether an inactivity period for receiving audio input has expired.

At block 440, at least a portion of the audio input may be compared to one or more predetermined audio commands. In various embodiments, the portion of the audio input may be the first portion of the audio input that may be after the second portion of the audio input received by the battery-operated communication device. The predetermined audio commands may enable users in public-safety or mission-critical environments to perform one or more tasks including, but not limited to, changing or querying communication zones or communication channels of the battery-operated communication device, changing or querying the volume of the battery-operated communication device, changing the radio profile, and querying information about the battery of the battery-operated communication device.

At block 445, it may be determined whether there is a matching command in the predetermined audio commands, which may also be referred to as a matching command. In various embodiments, the first portion of the audio input that was compared to predetermined audio command(s) may correspond to at least a matching command of the predetermined audio command(s). A matching command may correspond to the first portion of audio input without exactly matching the first portion. Skilled artisans will appreciate that the first portion may correspond to the matching command in any suitable manner, including but not limited to a partial match and a probability of a match being above a threshold. When there is no matching command, method 400A may return to block 435, where it may be determined whether an inactivity period for receiving audio input has expired.

When there is a matching command, method 400A may proceed to block 438 where the inactivity period timer for receiving audio input is reset. The inactivity period timer may be reset to any suitable value, such as reset to a zero value for incrementing the inactivity period timer or reset to a non-zero value for decrementing the inactivity period timer. At block 450, a processor of the battery-operated communication device may process the matching command. Processing of the command may require querying information and outputting the information to a user (e.g., displayed or played back over a speaker) or configuring one or more components of battery-operated communication device, such as transceiver 265 of baseband processing unit 210 as described for FIG. 2. In at least some embodiments, one or more processors in battery-operated communication device may process a command using one or more external processors communicatively coupled to the device. In at least some embodiments, a notification about the matching command may be output to notify a user of the device that a match was found. The notification may be any suitable notification or group of notifications including, but not limited to, a visual notification output on a display or an audio notification output from a speaker. The notification may be output before, after, or in parallel with processing the matching command. As illustrated in FIG. 4A, blocks 430, 432, 434, 436, 440, 445, 438, and 450 may be referred to as block 404, which may include the flow between the blocks.

Figure 4B:
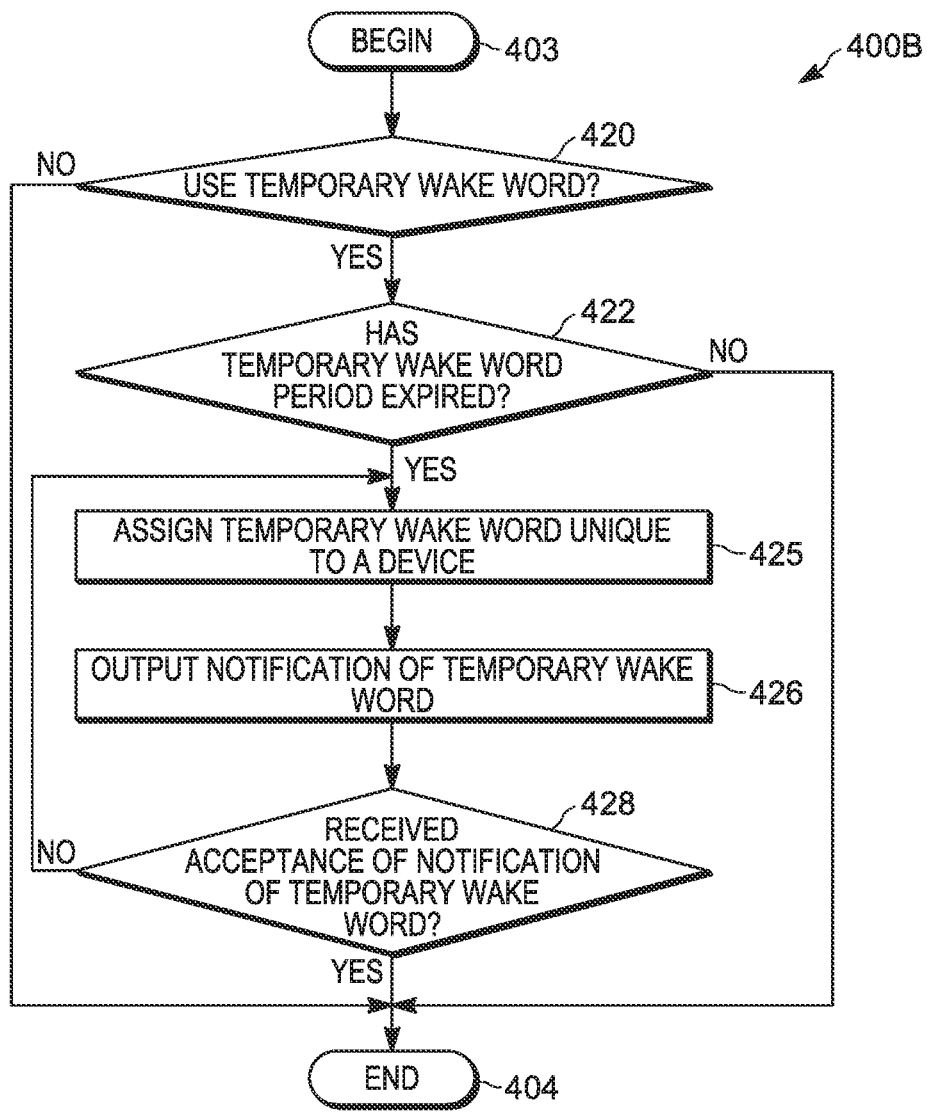
FIG. 4B is a flowchart illustrating selected elements of an example method for temporary hands-free voice interaction with notification and acceptance of a temporary wake word, in accordance with some embodiments.

Referring now to FIG. 4B, there is a flowchart illustrating selected elements of an example method 400B for temporary hands-free voice interaction with notification and acceptance of a temporary wake word, in accordance with some embodiments. While a particular order of operations is indicated in FIG. 4B for illustrative purposes, the timing and ordering of such operations may vary where appropriate without negating the purpose and advantages of the examples set forth in detail throughout the remainder of this disclosure. For example, method 400B may periodically initiate hands-free operation. As another example, method 400B may determine whether a temporary wake word period has expired before determining whether to use a temporary wake word.

In this example embodiment, method 400B begins with block 403 in FIG. 4B and continues with block 420. Similar to block 403 as described for FIG. 4A, block 403 in FIG. 4B may include receiving a first trigger at block 410, initiating hands-free operation at block 415, determining whether an inactivity period for receiving audio input has expired at block 435, determining whether a second trigger was received to disable hands-free operation at block 460, exiting hands-free operation at block 465, and ending at block 470.

At block 420, it may be determined whether to use a temporary wake word for voice interaction during hands-free operation. When use of a temporary wake word is not enabled, method 400B may proceed to block 430 of block 404, as described for block 430 in block 404 of FIG. 4A. Similar to block 404 as described for FIG. 4A, block 404 in FIG. 4B may include determining whether audio input has been received at block 430, determining whether to compare for a temporary wake word at block 432, comparing at least a portion of audio input to the temporary wake word at block 434, determining whether the portion of audio input corresponds to the temporary wake word at block 436, comparing at least a portion of the audio input to one or more predetermined audio commands at block 440, determining whether there is a matching command at block 445, resetting an inactivity period timer at block 438, and processing the matching command at block 450.

Otherwise, when the use of a temporary wake word is enabled, method 400B may proceed to block 422, where it may be determined whether the temporary wake word period has expired. The temporary wake word may be assigned to a battery-operated communication device or a user of a battery-operated communication device for a predetermined or dynamic period. When the period for the temporary wake word has expired, the temporary wake word may need to be reassigned. The temporary wake word may not be expired for any suitable period, including but not limited to, no expiration of the temporary wake word that is assigned, the inactivity period, and a fixed period, such as for five minutes. In at least some embodiments, the temporary wake word period may be reset when the inactivity period is reset.

When the temporary wake word has not expired, method 400B may proceed to block 430, as described for block 430 in block 404 of FIG. 4A. Otherwise, when the temporary wake word has expired, method 400B may proceed to block 425, where a temporary wake word may be assigned to the battery-operated communication device, or the user of the battery-operated communication device. Rather than use a universal wake word for multiple battery-operated communication devices or multiple users of battery-operated communication devices, a temporary wake word is unique to a battery-operated communication device or a user of the battery-operated communication device. Multiple devices in proximity or communicating over common channels may avoid cross-talk and accidental audio input for hands-free operation by using a temporary wake word that is unique to each battery-operated communication device or the user of the battery-operated communication device.

At block 426, a notification of the temporary wake word may be output, for example, in an audio or visual manner, similar to block 311 as described for FIG. 3C. At block 428, an acceptance of the notification of the temporary wake word may be received. The acceptance may correspond to an approval for the new temporary wake word by, for example, a local user of the battery-operated communication device (e.g., emergency medical technician) or a remote user of the battery-operated communication device (e.g., a dispatcher). In at least some embodiments, acceptance may be received automatically when a period of time elapses after notification is output. The period of time may be predetermined, or dynamically set by a local or remote user.

When an acceptance of the notification of the temporary wake word is received, method 400B may proceed to block 430, where it may be determined whether audio input has been received, as described for block 430 of block 404 of FIG. 4A. Otherwise, when the acceptance of the notification of the temporary wake word is not received (e.g., a rejection of the new temporary wake word), method 400B may proceed to block 425 to assign another temporary wake word unique to the battery-operated communication device, or a user of the battery-operated communication device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:
1. A method for temporary hands-free voice interaction, comprising:
  receiving a first trigger to enable hands-free operation without a local user request, the first trigger corresponding to:
    a first remote user request;
    a first event condition; or
    a first location condition;
  initiating the hands-free operation after the receipt of the first trigger;
  receiving audio input after the initiation of the hands-free operation;
  comparing at least a first portion of the audio input to one or more predetermined audio commands after the initiation of the hands-free operation;
  determining whether the first portion of the audio input compared to the one or more predetermined audio commands corresponds to a matching command of the one or more predetermined audio commands;
  processing the matching command based on a determination that the first portion of the audio input corresponds to the matching command; and
  exiting the hands-free operation based on:
    determining that an inactivity period for receiving audio input has expired; or
    receiving a second trigger to disable the hands-free operation, the second trigger corresponding to:
      a second remote user request;
      a second event condition; or
      a second location condition.

2. The method of claim 1, further comprising:
  assigning a temporary wake word to a device, wherein the temporary wake word is unique to the device;
  comparing at least a second portion of the audio input to the temporary wake word after the initiation of hands-free operation, wherein the second portion precedes the first portion in the audio input; and
  determining whether the second portion of the audio input corresponds to the temporary wake word based on the comparison between the second portion of the audio input and the temporary wake word, wherein the comparison of the first portion of the audio input to the one or more predetermined audio commands is based on a determination that the second portion of the audio input corresponds to the temporary wake word.

3. The method of claim 1, further comprising:
  outputting a notification for the hands-free operation after the receiving of the first trigger to enable the hands-free operation;
  receiving a review indication of the hands-free operation in response to the notification for the hands-free operation, wherein:
    the review indication corresponds to an approval or a rejection to initiate the hands-free operation;
    the initiating of the hands-free operation is based on the approval to initiate the hands-free operation; and
    the receiving of the audio input is enabled by the hands-free operation listening for the audio input.

4. The method of claim 1, wherein:
  the first trigger corresponds to the first remote user request; and the first remote user request represents the hands-free operation being enabled by a dispatcher without interaction by a local user of a device that receives the first trigger, wherein:
the dispatcher is remote to the device that receives the first trigger;
the hand-free operation being enabled for:
the local user of the device;
all users assigned to an incident; or
all users assigned to a role for the incident.

5. The method of claim 1, wherein:
the first trigger corresponds to the first event condition; and
the first event condition represents the hands-free operation being enabled without interaction by a local user of a device that receives the first trigger by a change in:
a state of a vehicle corresponding to a user;
a status of the user; or
a state of the user.

6. The method of claim 1, wherein:
the first trigger corresponds to the first location condition;
the first location condition represents an arrival of a user on a location of an incident; and
the first location condition operable to be provided by:
a location of the user corresponding to the location of the incident;
the arrival of the user on the location of the incident before a second user; or
a dispatcher.

7. The method of claim 1, further comprising:
limiting the one or more predetermined audio commands to a subset of the one or more predetermined audio commands based on a determination that the hands-free operation is initiated in a critical environment, wherein the comparing of at least the first portion of the audio input to the one or more predetermined audio commands does not compare the first portion to the one or more predetermined audio commands not found in the subset of the one or more predetermined audio commands.

8. The method of claim 2, further comprising:
outputting a temporary wake word notification of the assigned temporary wake word;
receiving, in response to the temporary wake word notification, an approval of the assigned temporary wake word or a rejection of the assigned temporary wake word; and
assigning another temporary wake word to the device in response to the receipt of the rejection of the assigned temporary wake word.

9. The method of claim 2, further comprising:
outputting a wake word expiration notification based on a determination that a temporary wake word period has expired;
assigning a new temporary wake word to the device; and
outputting a new wake word notification for a new temporary wake word, the new wake word notification provided by:
a voice announcement;
audio tone; or
visual indication.

10. A battery-operated communication device for temporary hands-free voice interaction, comprising:
a microphone configured to receive sound;
a processor communicatively coupled to the microphone, the processor configured to:
receive a first trigger to enable hands-free operation without a local user request, the first trigger corresponding to:
a first remote user request;
a first event condition; or
a first location condition;
initiate the hands-free operation after the receipt of the first trigger;
receive audio input using the microphone, the receipt of the audio input after the initiation of the hands-free operation;
compare at least a first portion of the audio input to one or more predetermined audio commands after the initiation of the hands-free operation;
determine whether the first portion of the audio input compared to the one or more predetermined audio commands corresponds to a matching command of the one or more predetermined audio commands;
process the matching command based on a determination that the first portion of the audio input corresponds to the matching command; and
exit the hands-free operation based on:
a determination that an inactivity period for receiving audio input has expired; or
receipt of a second trigger to disable the hands-free operation, the second trigger corresponding to:
a second remote user request;
a second event condition; or
a second location condition.

11. The battery-operated communication device of claim 10, wherein the processor is further configured to:
assign a temporary wake word to a user, wherein the temporary wake word is unique to the user;
compare at least a second portion of the audio input to the temporary wake word after the initiation of hands-free operation, wherein the second portion precedes the first portion in the audio input; and
determine whether the second portion of the audio input corresponds to the temporary wake word based on the comparison between the second portion of the audio input and the temporary wake word, wherein:
the comparison of the first portion of the audio input to the one or more predetermined audio commands is based on a determination that the second portion of the audio input corresponds to the temporary wake word;
the comparison of at least the first portion of the audio input to one or more predetermined audio commands is based on the determination that the second portion of the audio input corresponds to the temporary wake word.

12. The battery-operated communication device of claim 10, wherein the processor is further configured to:
output a notification for the hands-free operation after the receipt of the first trigger to enable the hands-free operation;
receive a review indication of the hands-free operation in response to the notification for the hands-free operation, wherein:
the review indication corresponds to an approval or rejection to initiate the hands-free operation;
the initiation of the hands-free operation is based on the approval to initiate the hands-free operation; and
the receipt of the audio input using the microphone is enabled by the hands-free operation listening for the audio input.

13. The battery-operated communication device of claim 10, wherein:
the first trigger corresponds to the first remote user request;
the first remote user request represents the hands-free operation being enabled by a dispatcher without interaction by a local user of the battery-operated communication device, wherein:
the dispatcher is remote to the battery-operated communication device;
the hand-free operation being enabled for:
the local user of the battery-operated communication device;
all users assigned to an incident; or
all users assigned to a role for the incident.

14. The battery-operated communication device of claim 10, wherein:
the first trigger corresponds to the first event condition; and
the first event condition represents the hands-free operation being enabled without interaction by a local user of the battery-operated communication device by a change in:
a state of a vehicle;
a status of a user; or
a state of the user.

15. The battery-operated communication device of claim 10, wherein:
the first trigger corresponds to the first location condition;
the first location condition represents an arrival of a user on a location of an incident, wherein the first location condition is indicated by:
a location of the user matching the location of the incident;
the arrival of the user on the location of the incident before a second user; or
a dispatcher.

16. The battery-operated communication device of claim 10, wherein:
the processor is further configured to limit the one or more predetermined audio commands to a subset of the predetermined audio commands based on a determination that the hands-free operation is initiated in a critical environment; and
the comparison of at least the first portion of the audio input to the one or more predetermined audio commands does not compare the first portion to the one or more predetermined audio commands not found in the subset of the one or more predetermined audio commands.

17. The battery-operated communication device of claim 11, wherein the processor is further configured to:
output a temporary wake word notification of the assigned temporary wake word;
receive, in response to the temporary wake word notification, an approval of the assigned temporary wake word or a rejection of the assigned temporary wake word; and
assign another temporary wake word to the user in response to the receipt of the rejection of the assigned temporary wake word.

18. The battery-operated communication device of claim 11, further comprising:
a display configured to output video, the display communicatively coupled to the processor;
a speaker configured to output sound, the speaker communicatively coupled to the processor, wherein the processor is further configured to:
output a wake word expiration notification based on a determination that a temporary wake word period has expired;
assign a new temporary wake word to the user; and
output a new wake word notification for a new temporary wake word, the new wake word notification provided by:
a voice announcement using the speaker;
an audio tone using the speaker; or
a visual indication using the display.

* * * * *